(12) United States Patent
Herrmann et al.

(10) Patent No.: US 6,502,014 B1
(45) Date of Patent: Dec. 31, 2002

(54) REGULATING CIRCUIT FOR REGULATING THE DRIVING STABILITY OF A MOTOR VEHICLE USING A MOTOR VEHICLE REFERENCE MODEL

(75) Inventors: Torsten Herrmann, Frankfurt am Main (DE); Mile Jokic, Rochester Hills, MI (US); Ulrich Lüders, Burgdorf (DE); Holger Duis, Frankfurt am Main (DE); Ralf Endress, Neu-Anspach (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

(21) Appl. No.: 09/720,490

(22) PCT Filed: Jun. 22, 1999

(86) PCT No.: PCT/EP99/04324

§ 371 (c)(1),
(2), (4) Date: May 2, 2001

(87) PCT Pub. No.: WO99/67115

PCT Pub. Date: Dec. 29, 1999

(30) Foreign Application Priority Data

Jun. 22, 1998 (DE) .......................................... 198 27 654
Feb. 1, 1999 (DE) .......................................... 199 03 691
Apr. 28, 1999 (DE) .......................................... 199 19 180

(51) Int. Cl.$^7$ ................................................ B62D 5/06
(52) U.S. Cl. ........................ 701/1; 701/50; 701/70; 701/22; 701/41; 701/80; 188/151 R; 188/152; 33/286; 33/288; 33/356; 33/361; 180/197; 180/247; 180/248; 180/249; 303/121; 303/20; 303/122

(58) Field of Search ............................... 701/70, 50, 22, 701/41, 80, 1; 188/151 R, 152; 33/286, 288, 356, 361; 180/197, 247, 248, 249; 303/121, 20, 122

(56) References Cited

U.S. PATENT DOCUMENTS

| | | | | |
|---|---|---|---|---|
| 4,926,955 A | * | 5/1990 | Ohmura et al. | 180/414 |
| 5,103,925 A | * | 4/1992 | Imaseki et al. | 180/415 |
| 5,159,991 A | * | 11/1992 | Tsuyama et al. | 180/197 |
| 5,605,201 A | * | 2/1997 | McGinn et al. | 180/197 |
| 5,615,932 A | * | 4/1997 | Okazaki | 303/121 |
| 5,924,952 A | * | 7/1999 | Bowen | 475/204 |
| 5,973,463 A | * | 10/1999 | Okuda et al. | 180/282 |
| 5,989,146 A | * | 11/1999 | Brown et al. | 180/247 |
| 6,071,207 A | * | 6/2000 | Stephens et al. | 475/204 |
| 6,339,738 B1 | * | 1/2002 | Kohl et al. | 188/151 R |

FOREIGN PATENT DOCUMENTS

| | | |
|---|---|---|
| DE | 44 46 534 | 6/1996 |
| DE | 195 21 086 | 12/1996 |

* cited by examiner

Primary Examiner—Michael J. Zanelli
Assistant Examiner—Ronnie Mancho
(74) Attorney, Agent, or Firm—Rader, Fishman & Grauer PLLC (57) ABSTRACT

The present invention relates to a control circuit for controlling the driving stability of a vehicle where the input quantities determining the course of track are input in a vehicle model circuit which determines at least on nominal value for a control quantity subject to parameters memorised in the vehicle reference model on the basis of a vehicle reference model reproducing the characteristics of the vehicle.

30 Claims, 5 Drawing Sheets

Course of the Functions from Equations (10) to (13)

HYPOTHESIS 1

FIG. 5

HYPOTHESIS 2

HYPOTHESIS 3

FIG. 6

HYPOTHESIS 4

FIG. 7

REGULATING CIRCUIT FOR REGULATING THE DRIVING STABILITY OF A MOTOR VEHICLE USING A MOTOR VEHICLE REFERENCE MODEL

TECHNICAL FIELD

The present invention generally relates to vehicle stability control, and more particularly relates to a control circuit for controlling the driving stability of a vehicle in which the input quantities defining the course of the vehicle are input to a vehicle model circuit.

BACKGROUND OF THE INVENTION

The control circuits control the steering behavior of the vehicle, if the vehicle's path does not correspond to the path intended by the driver.

Especially in case of external influences, e.g. different adhesion on wet, icy or dry road sections, side wind and reactions to load alternations, an additional torque is necessary so that the way actually covered by the vehicle corresponds to the way intended by the driver.

Input quantities resulting from the path intended by the driver, e.g. steering wheel angles or speed, are transmitted to a vehicle model circuit which on the basis of said input quantities and parameters typical for the driving behavior of the vehicle, but also on the basis of the characteristics of the environment (coefficient of friction of the road surface and similar) defines a nominal yaw rate being compared with the actually measured yaw rate. The difference between the yaw rates is converted into a yaw torque by means of a so-called yaw torque controller, the yaw torque representing the input quantity of the control circuit.

The control circuit, on the other hand, defines the brake pressure to be applied on the single wheel brakes, if necessary subject to the driver's request to apply a certain brake pressure on the wheel brakes. In addition to the desired braking effect, the brake pressure should create an additional torque on the vehicle supporting the driving behavior of the vehicle in the direction in which the driver intends to steer the vehicle. From this results that the quality of controlling the yaw rate of the vehicle is substantially defined by the quality of the vehicle model circuit which predefines the desired yaw rate on the basis of the input data of the driver.

Different vehicle models can be used in the control circuit which simulate the driving behavior of the vehicle by way of calculation, the different vehicle models being based on simplified assumptions concerning the driving behavior of a vehicle.

A known vehicle model is the so-called linear dynamic single-track model. In this model the driving characteristics of a vehicle are reduced, by way of calculation, to one vehicle model in which the front and rear wheels each are combined in pairs to one wheel being positioned on the longitudinal axis of the vehicle.

The following system equations are valid for a single-track model in a condition representation:

$$\dot{\beta} = c_{11}\frac{\beta}{v} - \dot{\psi} + c_{12}\frac{\dot{\psi}}{v^2} + c_{13}\frac{\delta}{v} \tag{1}$$

$$\ddot{\psi} = c_{21}\beta + c_{22}\frac{\dot{\psi}}{v} + c_{23}\delta \tag{2}$$

$\beta$ defining a slip angle, $\dot{\psi}$ the yaw rate and $\delta$ the steering angle.

The model coefficients $C_{ij}$ are included in the system equations and formed as follows:

$$c_{11} = -\frac{c_h + c_v}{m} \quad c_{12} = \frac{c_h l_h - c_v l_v}{m} \quad c_{13} = \frac{c_v}{m} \tag{3}$$

$$c_{21} = \frac{c_h l_h - c_v l_v}{\Theta} \quad c_{22} = \frac{c_h l_h^2 + c_v l_v^2}{\Theta} \quad c_{23} = \frac{c_v l_v}{\Theta} \tag{4}$$

$C_h$ and $c_v$ represent the resulting stiffness determined by the control circuit for controlling the driving stability of the vehicle in consideration of the wheel suspension and steering elasticity on the rear resp. front axle. The values $l_h$ and $l_v$ represent the distances of rear and front axle from the vehicle's gravity centre. $\Theta$ is the yaw moment of inertia of the vehicle, i.e. the moment of inertia of the vehicle around its vertical axis.

The standard parameters for the memorized single-track model which form the basis of the model coefficient $c_{ij}$, are obtained by measurements outside the vehicle on the basis of an off-line parameter identification. The measured controller and sensor quantities of the driving stability control are used for identification. Four speed sensors, one for each wheel, a yaw acceleration meter, a transverse acceleration meter and at least one pressure sensor for the brake pressure generated by the brake pedal are provided on the vehicle in order to detect the vehicle dynamics. The parameters are determined by means of one or more model vehicles, and the "standard parameter set" is memorized in the vehicle model circuit.

During travel, vehicles with standard parameter sets memorized in the vehicle model present erroneous control activation by means of the driving stability control, if the condition quantities on which the model coefficients are based during off-line parameter identification, differ from the actual condition quantities being defined by the individual configuration or equipment of the vehicle. The deviations may range from a mere comfort problem to an impairment of the driving behavior of the vehicle. There is an erroneous control activation by the driving stability control if the individual configuration of the vehicle leads to deviations of the standard parameters memorized in the dynamic single-track model or if the parameters on which the vehicle is based due to its individual configuration are lying outside the control threshold of the standard parameters.

One known solution to the problem is to expand control thresholds in critical areas of the vehicle stability. This leads to functionality and performance losses due to an unnecessary threshold expansion in vehicles with an individual configuration or equipment which is detected by the standard parameters defined in the single-track model and does not prevent reliably the erroneous control activation if there are extreme deviations with regard to the configuration or equipment of a single vehicle.

It is the object of the present invention to provide for a generic control circuit preventing the erroneous control activation. This object is achieved according to the present invention by that at least one of the parameters is varied subject to at least one separately defined measuring quantity.

The invention includes a generic control circuit that is used in such a way that the vehicle model is adapted during operation by the identification of the standard parameters specific to the every single vehicle by means of input quantities which are made available by the vehicle's sensor system. Basis of the invention is the finding, that the individual vehicle due to different configuration or equipment variants, as e.g. tire type (winter tires, summer tires, all-weather-tires), tire size (15"/16"/17"), condition, especially the lateral tire stiffness, changes of the chassis, production tolerances or loading, differs or deviates considerably from a model vehicle or model vehicles which are used for determining the standard parameter set memorized in the single-track model.

One advantageous embodiment of the control circuit is characterized by that a vehicle identification means is foreseen, the output signals of which are transmitted to the vehicle reference model and that the output signals in consideration of individual condition quantities of the vehicle adapt the standard parameters memorized in the vehicle reference model or substitute them by newly built standard parameters.

A further improvement of the control circuit is achieved wherein the vehicle identification means is provided with an identification plausibility means for switching an identification module into active or passive mode subject to the individual input quantities.

Furthermore it is useful to configure the control circuit in such a way that the yaw speed and/or the steering angle and/or the steering angle speed and/or the transverse acceleration and/or the longitudinal acceleration and/or the slip angle speed and/or the wheel speed are the quantities being input.

One advantageous embodiment of the control circuit is characterized by that the deviations are defined by individual input quantities and deviations of the standard parameters or actual standard parameters are generated by means of an identification algorithm.

A further improvement of the control circuit is achieved wherein a computing unit the deviations of the single input quantities are converted into parameter deviations of the standard parameters or actual standard parameters.

It is also useful to configure the control circuit in such a way that the identification plausibility means for informs the identification module as to whether the individual input quantities are lying in a predetermined tolerance range.

One advantageous embodiment of the control circuit is characterized by that the parameter deviations of the standard parameters or the actual parameters are defined within predetermined limit value ranges.

A further improvement of the control circuit is achieved by that the parameter deviations of the standard parameters or the actual standard parameters are learned by algorithms for the parameter identification.

Furthermore it is useful to configure the control circuit in such a way that parameter deviations of the standard parameters or actual standard parameters a learned according to a Least Square Procedure (LS;) and/or a Generalized Least Square Procedure (GLS) and/or an Instrumental Variable Procedure (IV) and/or a Maximum Likelihood Procedure (ML) and/or an Output Error Procedure.

One advantageous embodiment of the control circuit is characterized by that the vehicle reference model is the dynamic single-track model.

A further improvement of the control circuit is achieved by that at least one of the parameters corresponds to the lateral tire sniffness of one or more wheels or depends on the lateral tire stiffness of one or more wheels.

Thus it is assured that a possibly big reference quantity is made available for controlling the vehicle in every driving situation with individually adapted parameters.

Empirical studies resulted in the following deviations of the standard parameters when several driving conditions were identified:

| | |
|---|---|
| Self-steering gradient EG: | $3.32e^{-3}$ to $4.34e^{-3}$ $s^{2}$*rad/m |
| Theta $\Theta$: | 1903 to 2309 kg/m$^2$ |
| Wheel stability $c_v$: | 72084 to 91113 N/rad |
| Wheel stability $c_h$: | 135299 to 156308 N/rad |

Since a vehicle identifying means is foreseen the output signals of which are transmitted to the vehicle reference model, and since the output signals adapt the standard parameters memorized in the vehicle reference model to the individual vehicle in consideration of the individual condition quantities of the vehicle or substitute them by newly built standard parameters, every vehicle is displayed online in the vehicle model according to its configuration or equipment. Erroneous control activations are reliably avoided since even in case of extreme tires the relative model coefficients $c_{ii}$ are adapted. By learning the vehicle-specific standard parameters during given driving conditions and their actualization depending on time or on the driving condition or the driving behavior of the vehicle, not only the fixed configuration and/or equipment variants assigned to the vehicle, especially of the torque, are considered, but also the changes resulting from the vehicle motion, e.g. the tire temperature, are detected and considered. During travel, the vehicle parameters are adapted to the real individual vehicle behavior by means of the input quantities measured by the vehicle sensors.

In an advantageous embodiment the vehicle identification means includes an identification plausibility means which subject to the individual input quantities switches an identification module into active or passive mode. By the foreseen identification plausibility means for the parameters are identified only during a stable travel since only in this condition the identification module is switched to the active mode thus permitting to learn the standard parameters. It is reliably avoided that the identification module is activated during an unstable travel.

According to one embodiment, the stable travel is recognized by means of measured input quantities determined individually on each vehicle subject to the condition quantities. The input quantities are equal to the yaw speed and/or the steering angle and/or the transverse acceleration and/or the longitudinal acceleration and/or the slip angle acceleration and/or the wheel speeds. In addition to this, condition quantities of other control circuits or control systems, as e.g. anti-blocking systems (ABS) or traction slip control systems (TCS), are transmitted as input quantities to the identification plausibility means. The input quantities representing the actual condition of said control circuits or control systems also serve for recognizing the stable travel, which, evaluating the above mentioned input quantities, in the identification plausibility means for is stable, if no further control circuit is active. In a stable travel e.g. the input quantity of an individual vehicle meets the following conditions:

transverse acceleration ($a_{quer}$)<0.3 g longitudinal acceleration ($a_{long}$)<0.1 g yaw speed ($\psi$)<10°/s steering speed ($\beta$)<90°/s and no other control circuits are active. On the above mentioned conditions, the identification module is switched to the active mode.

According to one preferred embodiment of the present invention, in the identification module or a comparison means which is part of the identification module or the distribution logic, the deviations of the individual input quantities are determined and parameter deviations of the standard parameters or actual standard parameters are generated by means of an identification algorithm. In a preferred embodiment the identification module therefore includes a computing unit converting the individual input quantities and/or their deviations into the parameter deviations of the standard parameters or the actual standard parameters. In this case the parameter deviations of the standard parameters or actual standard parameters are learned according to the Least Square Procedure (LS) and/or Generalized Least Square Procedure (GLS) and/or Instrumentable Variable Procedure (IV) and/or Maximum-Likelihood Procedure (ML) and/or Output Error Procedure (OE). A Least Square Procedure determines the standard parameters from the deviations of the individual input parameters by minimizing the error between the vehicle reference model and the vehicle. Minimizing the sum of squares of the model error is used here as quality criterion. A direct solution can be obtained by setting the first partial derivation to zero.

Parameters are made available to the identification module by the identification plausibility means for which help determine whether the individual input quantities or their deviations between the measured actual input quantities and the nominal input quantities calculated in the controller are lying within a predetermined tolerance range. If the individual input quantities lying in the predetermined tolerance range are derived, the parameters which can be correlated to individual quantities within predetermined limit value ranges are defined.

Further advantages, particularities and appropriate improvements of the present invention result from the dependent claims and the following representation of preferred embodiments of the invention on the basis of the drawings.

DETAILED DESCRIPTION OF THE PREFERRED EMBODIMENTS

Figure 1:
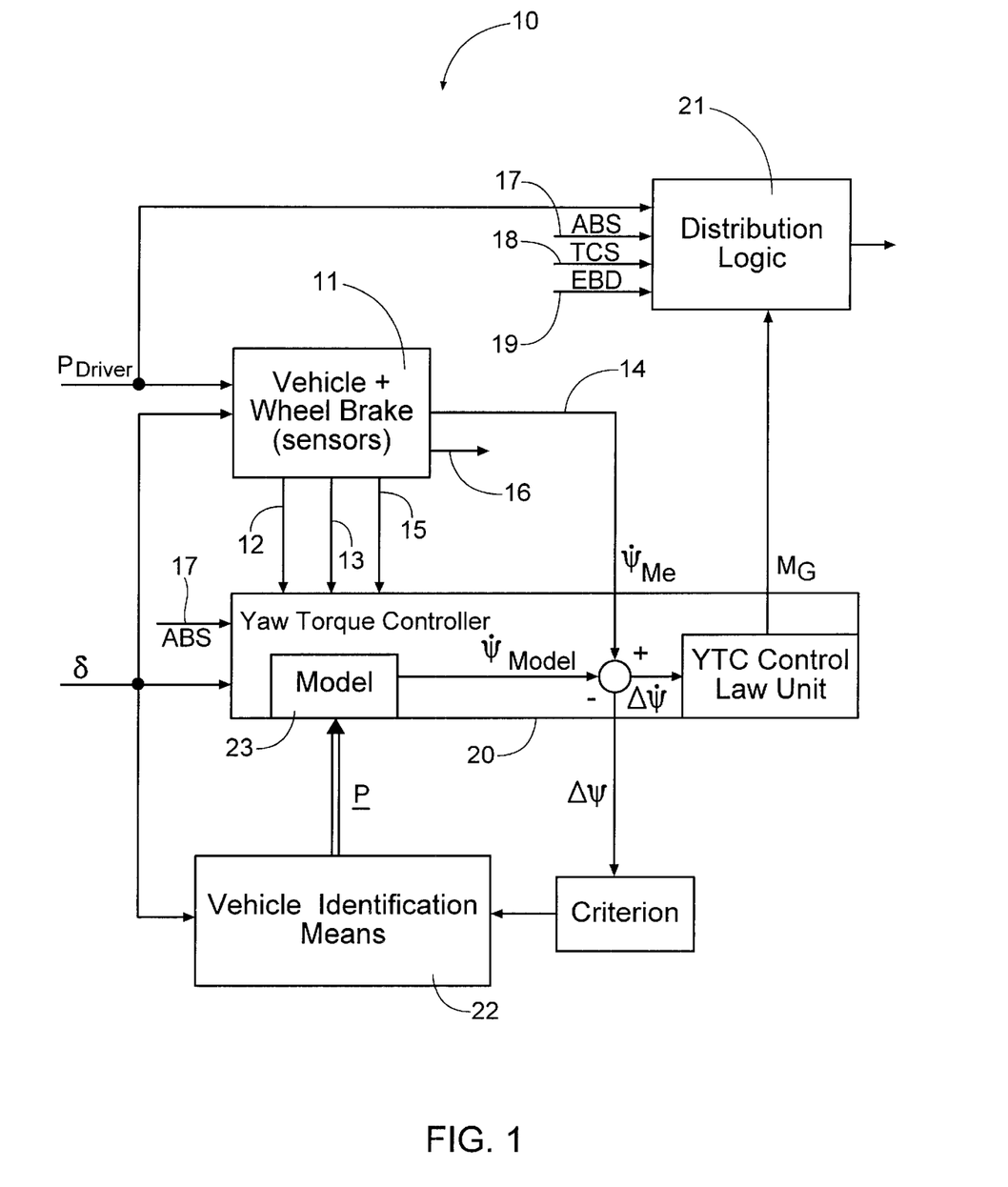
FIG. 1 shows a basic structure of a vehicle identification means according to the invention.

FIG. 1 shows the basic structure of the control circuit 10 for controlling the stability of a vehicle. The parameters defined by the driver, as e.g. brake pressure by the driver $P_{Fahrer}$ and steering angle δ act on the vehicle. The parameters resulting from this, as e.g. actual motor torque 12, transverse acceleration $a_{Quer}$ 13, yaw angle speed $\dot{\psi}$ 14, wheel speeds 15 and hydraulic signals 16, are measured as wheel brake pressures on the vehicle. The driving stability control circuit 4 includes electronic controllers 17, 18, 19 and 20 in order to evaluate these data, each of the controllers being preferably assigned to one control system. Controller 17 is assigned to an anti-blocking system (ABS), controller 18 to a traction slip control (TCS), controller 19 to an electronic brake force distribution (EBD) and controller 19 to a yaw torque control (YTC). The electronic controllers ABS 17, TCS 18 and EBD 19 may correspond invariably to the state of the art and are therefore not described in detail.

Controller 20 which is used for the yaw torque control YMC also receives data regarding the prevailing motor torque, the actual motor torque. From the sensors it furthermore receives data regarding the transverse acceleration $a_{Quer}$ and the yaw angle speed $\dot{\psi}$ of the vehicle 11. Since controller 17 of the ABS anyway determines a vehicle reference speed VREF by means of the single wheel speed of the vehicle wheels, on the basis of which an excessive brake slip of one of the wheels can be determined, such reference speed has not to be calculated in the YMC controller 20, but is adopted as input quantity by the ABS controller 17. Further input quantities, as e.g. the longitudinal acceleration $a_{Long}$ and the determination of the coefficient of friction μ, which are used for controlling the yaw torque are not described in detail with regard to their generation. The same applies to further input quantities.

The four electrical controllers develop predetermined brake pressure values for the single wheels on the basis of their own control strategies.

The predetermined pressure values of the YMC controller 20 for the single wheel brake pressures are determined as follows:

The YMC controller 20 first calculates an additional yaw torque MG leading to a stabilization of the driving condition in a curve, if it is generated by a brake activation. Said value $M_G$ is transmitted to a distribution logic 21 which could also be represented as part of the YMC controller 20. The possible request of the driver to decelerate the vehicle is also transmitted to said distribution logic 21 and recognized on the basis of the driver's brake pressure $P_{Fahrer}$. On the basis of the given yaw torque $M_G$ and the requested driver's brake pressure the distribution logic 21 calculates yaw torque control pressures PYMC for the wheel brakes which can differ very much from each other for the single wheels. These yaw torque control pressures $P_{YMC}$ are transmitted to a circuit for the wheel brake pressures (not represented) as is the case with the predetermined pressure values calculated by the other controllers 17, 18 and 19 in order to optimize the function. Said circuit determines the nominal wheel pressures for an optimum driving stability on the basis of the driver's request.

FIG. 1 shows a YMC controller 20, in which a vehicle reference model is memorized calculating a predetermined value for changing the yaw angle speed Δψ̇ on the basis of the steering angle δ, a vehicle reference speed (by means of the ABS controller 17) and the measured yaw angle speedy $\dot{\psi}_{Meβ}$. Furthermore the coefficient of friction and impact quantities depending on the situation as well as further impact quantities are transmitted to the YMC controller 20.

In FIG. 1 the predetermined change values Δ for the yaw angle speed ψ̇ are as an example transmitted as a criterion to a vehicle identification means 22 as an input quantity, the vehicle identification means substituting the standard parameters memorized in the vehicle reference model 23 by modified or new standard parameters P or adapting the memorized standard parameters subject to the individual condition quantities of the vehicle.

Figure 2:
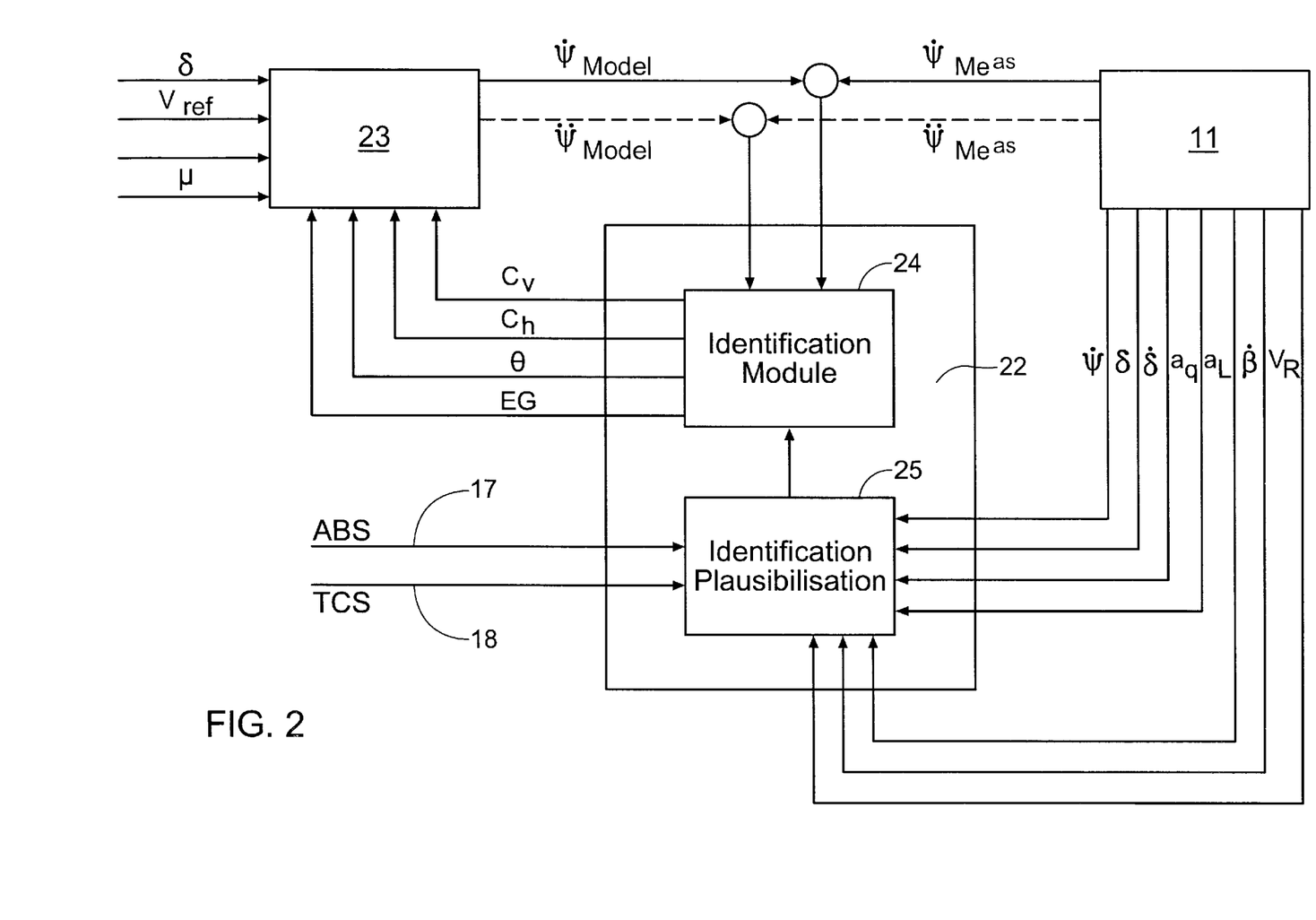
FIG. 2 shows a block diagram of a vehicle identification means with identification plausibility means according to the invention.

FIG. 2 shows a block diagram in which the parameter deviations of the standard parameters or actual standard parameters are generated within the vehicle identification means 22. For this reason the deviations Δ of the individual input quantities, as e.g. yaw speed ψ̇ and/or steering angle δ and/or steering angle speed Δ and/or transverse acceleration $a_{Quer}$ and/or longitudinal acceleration $a_{Long}$ and/or the slip angle speed β and/or wheel speeds, are transmitted to an identification algorithm of an identification module 24. The deviations of the individual input quantities are converted into parameter deviations of the standard parameter or actual standard parameters in a computing unit of the identification module 24. The parameter deviations of the standard parameter or the actual standard parameters, as e.g. self-steering gradient EG, yaw inertia moment Θ and/or lateral tire stiffness $c_v$ and $c_h$ are learned by means of algorithms for parameter identification according to the LS procedure and/or the GLS procedure and/or the IV procedure and/or the ML procedure and/or the Output Error procedure.

In case of the LS procedure, the standard parameters are determined on the basis of the deviations of the individual input quantities by minimizing the error between vehicle reference model and vehicle. In this case the quality criterion is the minimization of the sum of squares of the model error. A direct solution can be achieved by setting the first partial derivation to zero.

The parameter deviations of the standard parameter generated in such a way or the actual standard parameters which depend on the individual condition quantities of the vehicle 11, as e.g. tire type, tire size, modifications of the chassis, production variations, loading etc., are transmitted to the vehicle reference model adapting the standard parameter set memorized there to the individual vehicle 11 or substituting it.

The identification module is assigned to an identification plausibility means 25 for switching the identification module 24 into active or passive mode according to the individual measured input quantities, as yaw speed ψ̇ and/or steering angle δ and/or steering angle speed δ and/or transverse acceleration $a_{Quer}$ and/or longitudinal acceleration $a_{Long}$ and/or slip angle speed β and/or wheel speeds $v_R$. In addition to this, the identification plausibility means 25 for at least by the ABS and TCS controllers 17, 18 receives the condition quantities of these controllers 17 resp. 18, i.e. the information as to whether ABS controller 17 or TCS controller 18 are active or passive in the control mode. On the basis of said individual input quantities a stable vehicle 11 is detected and the identification module 24 is consequently put into active mode. According to one embodiment the identification module 24 is put into active mode, if the ABS controller 17 and the TCS controller 18 are not active and the transverse acceleration is less than 0.3 g, the longitudinal acceleration less than 0.1 g, the yaw speed less than $10°/s^2$ and the steering speed less than 90°/sec. Only if the stable travel of the vehicle 11 is defined by means of limit values, the parameter deviations of the standard parameters or actual standard parameters can be generated in the identification module by means of the algorithms for parameter identification and the deviations of the standard parameter set can be corrected online via feedback to the vehicle reference model 23. The identification plausibility means 25 for prevents that the parameter deviations of the standard parameters or the actual standard parameters with extreme or implausible values are learned, by informing the identification module 24 as to whether the generated parameter deviations of the standard parameters or the generated actual standard parameters are lying within predefined limit value ranges. By limiting the generated parameter deviations or actual standard parameters within predefined tolerance ranges which are derived via the individual input quantities it is guaranteed that the standard parameters memorized in the vehicle reference model 23 and adapted to the individual vehicle 11 are lying within plausible value ranges. By minimizing the model deviation in a stable vehicle condition the parameters for the single-track model are memorized with regard to the single vehicle and then fit ideally to the actual vehicle behavior when the vehicle is in an unstable condition.

It appeared that the controlling behavior of the yaw torque controller which is based on the comparison between measured and calculated yaw rate can differ considerably if the same vehicle is equipped with different tires. On the one hand, this may be caused by tires with considerable differences in abrasion on front and rear axle or by tires with an extreme rubber mixture, e.g. all season tires. In both cases the driving behavior changes in such a way that the parameters of the single-track model determined for the vehicle by means of parameter identification do not fit anymore, thus leading to a massive deviation between model and actual yaw rate even in case of stable driving maneuver which extremely increases the sensibility with regard to uneven road surfaces and leads to undesired control interventions.

One approach to solve this problem is the application of a known procedure for estimating the parameters online. For reasons of capacity and running time it is not possible to realize such a procedure in the control units used today.

Therefore studies have been executed as to whether there is a more simple procedure for optimizing the nominal yaw rate. The result was that the lateral tire stiffness on the rear axle is an important parameter for the course of the single-track model. In order to develop an adaptation procedure for this parameter, first a criterion was found according to which the lateral tire stiffness can be adapted from the available signals. Driving tests have shown that the behavior of the single-track model in stable driving situations: driving torque, brake torque and drag torque does not always show the same good correspondence to the measured yaw rate. This resulted in another requirement as to learn the lateral tire stiffness on the rear axle separately for the three situations thus correcting the single-track model according to the driving situation. Therefore it was necessary to determine learning conditions with which the driving situation can be distinguished and the adaptation intervals limited.

The simplified differential equations describing the vehicle motion are based as a standard on linear and stationary situations. In order to guarantee the validity of said equations, an adaptation may only take place if the above mentioned conditions can be supported by learning conditions.

The following conditions must preferably be met in order to be able to determine a stationary driving behavior:

1.5 $[m/s^2]$<transverse acceleration<6.5 $[m/s^2]$ and

|yaw acceleration| <25 $[degrees/s^2]$ and

|steering angle speed| <150 [degrees/s].

If these conditions are met, the learning algorithm is started and the three above mentioned driving situations are distinguished by means of an evaluation of the brake pressure, the motor and friction moment and the driver moment request.

The lateral tire stiffness is preferably adapted by the following procedure:

On the basis of a stationary approach for the yaw speed:

$$\dot{\psi} = \frac{\delta * v}{l + v^2 * EG} \quad (5)$$

and the equation for the self-steering gradient $$EG = \frac{m*(c_r*l_r - c_f*l_f)}{l*c_r*c_f} \quad (6)$$

the following relation for the measured yaw rate is achieved:

$$\dot{\psi}_{mess} = \frac{\delta * v}{l + v^2 * m * \frac{c_r*l_r - c_f*l_f}{l*c_r+c_f}} \quad (7)$$

Solving equation (3) with regard to the lateral tire stiffness on the rear axle, the following relation results:

$$c_{r\_neu} = \frac{\dot{\psi}*v^2*m*c_f*l_f}{\dot{\psi}*v^2*m*l_r + \dot{\psi}*l^2*c_f - \delta*v*l*c_f} \quad (8)$$

Thus $C_{r\_neu}$ corresponds to the value of the lateral tire stiffness on the rear axle which would be necessary for the vehicle to achieve the measured yaw rate with the predetermined vehicle speed and the steering angle, if the rest of the parameters for the single-track model are considered as being constant.

Since only the percentage change with regard to the original lateral tire stiffness is of interest, $c_{h\_neu}$ is divided by $c_{h\_alt}$.

In order to simplify the calculation, the term of equation (4) is divided by $\dot{\psi}*v*m*l_r$ resulting in $$1024 * \frac{c_{r\_neu}}{c_{r\_alt}} = \frac{\frac{v*1024*c_f*l_f}{2*c_{r\_alt}}}{\frac{v}{2} + \frac{1}{v}*\frac{c_f*l^2}{2*m*l_r} - \frac{\delta}{\dot{\psi}}*\frac{c_f*l}{2*m*l_r}} = \Delta C_{r\_corr\_fac} \quad (9)$$

with a scaling of 100/1024 [percent/LSB)].

In the right term numerator and denominator are divided by 2 in order not to exceed the range of Integer numbers when the numerical values are input.

As long as the learning conditions are met and $\Delta$Ch_corr_fac shows a deviation of less than 20%, $\Delta$Ch_corr_fac is integrated upwards and the integration period is calculated. Values with a deviation of more than 20% are not considered in the integral.

If the learning situation (driving, brake and drag torque situation) changes or the conditions

| | |
|---|---|
| yaw torque controller not active | and |
| no reverse travel | and |
| no MSR active | and |
| no TCS active | |
| \|estimated lateral inclination angle\| | <5° | are no longer met and at least 225 loops have been integrated, the correction value integral is divided by the integration period in order to get an average value. Said average value is used for adapting the lateral tire stiffness learned up to now for the respective driving situation, the following equation being valid:

$$\Delta C_{r\_corr\_facl\_neu} = \Delta C_{r\_facl\_alt} + \frac{(\Delta C_{r\_corr\_fac} - \Delta C_{r\_corr\_facl\_alt})}{*0.1} \quad (10)$$

The lateral tire stiffness for the 3 different driving situations are distinguished by the index corr_facl ... 3.

The criteria for recognizing the driving situation are also used for deciding with which $\Delta$ Cr_corr_facx the originally identified lateral tire stiffness on the rear axle is corrected when calculating the single-track model. It is thus guaranteed that the single-track model in every driving situation is calculated with individually adapted parameters in order to represent the best possible reference value.

It is especially useful to proceed as follows:

In the medium transverse acceleration range erroneous control activations of the ESP yaw rate controller are observed in case of oversteering which are caused by tires with reduced stiffness due to increased temperature or soft tire stock. Since this stiffness reduction is not foreseen in the generation of the nominal value of the controller, the so-called single-track model, there is a controlling difference although the vehicle is not unstable.

For this case it is especially useful to proceed from a stationary transmitting function which is treated as follows.

A conditional equation for correcting the self-steering gradient is derived from the stationary transmitting function. Said equation is evaluated in the stationary vehicle condition and the actual value of the lateral tire stiffness is determined from the self-steering gradient resulting from this evaluation by means of a hypothesis for changing the lateral tire stiffness. In this way the changed self-steering gradient of the vehicle is represented with the single-track model.

The stationary transmitting function of the linear single-track model is:

$$\frac{\dot{\psi}}{\delta} = \frac{v}{l + v^2 EG} \quad (11)$$

$\dot{\psi}$ being the yaw rate of the vehicle $\delta$ being the steering angle of the wheel l being the distance of the vehicle axles (wheel base)

v being the vehicle speed

EG being the self-steering gradient of the vehicle.

Assuming that the self-steering gradient has changed by the factor f, with the original self-steering gradient $EG_a$ results $$EG = f * EG_a \quad (12)$$

and from this assumption and equation (1) results a conditional equation for factor f:

$$f = \frac{1}{EG_a}\left(\frac{\delta}{v\dot{\psi}} - \frac{1}{v^2}\right) \quad (13)$$

Due to the validity range of equation (3) factor f can only be determined in the stationary condition range of the vehicle, i.e. both the steering wheel angle speed and the yaw acceleration may not exceed certain maximum limit values. Furthermore the transverse acceleration should be greater than a limit value (ca. 3 m/s²) in order to clearly determine the factor and to detect conditions of high friction coefficients. However, the transverse acceleration should be less than a limit value (ca. 5 m/s²) in order to still remain in the linear validity range of equation (1). Since equation (1), strictly seen, is valid only for the free rolling, the slip value (brake and drive slip) on all four wheels should be smaller than the maximum value so that the transverse forces which have been built up are still not reduced considerably.

As long as the slip on the four wheels is smaller than the maximum value, the correction factors determined on the basis of equation (13) are added and serve for building an average value which on its part represents the new correction value.

The relation between the self-steering gradient and the lateral tire stiffness is:

$$EG = \frac{m(c_h \cdot l_h - c'_v \cdot l_v)}{c_h \cdot c'_v \cdot l} \tag{14}$$

m being the vehicle mass
$c'_v$ being the total lateral stiffness on the front axle
$c_h$ being the lateral tire stiffness on the rear axle
$l_v$ being the distance front axle/center of gravity
$l_h$ being the distance rear axle/center of gravity
l being the wheel base.

The total lateral stiffness of the front axle consists of connecting in series the lateral tire stiffness and the steering stiffness:

$$\frac{1}{c'_v} = \frac{1}{c_v} + \frac{1}{c'_L} \tag{15}$$

C'L being the steering stiffness (referred to the total trail)
$c_v$ being the lateral tire stiffness of the front axle wheels.

Thus there is only one equation for determining the two stiffness values with known self-steering gradients. Four models are represented as an example:

1) Both stiffness values change by the same factor d:

$$c'_v = c_{v,a} \cdot d \quad c_h = c_{h,a} \cdot d \tag{16}$$

2) The lateral tire stiffness of the rear axle tires $c_{h,a}$ changes by factor d and the lateral stiffness of the front axle remains constant:

$$c'_v = \text{konst} \quad c_h = c_{h,a} \cdot d \tag{17}$$

3) The lateral stiffness of the front axle $c'_v$ changes by factor d and the lateral tire stiffness on the rear axle remains constant:

$$c'_v = c'_{v,a} \cdot d \quad c_h = \text{konst} \tag{18}$$

4) The lateral tire stiffness of rear and front axle ($C_{h,a}$ and $C_{v,a}$) change by factor d:

$$c_v = c_{v,a} \cdot d \quad c_h = c_{h,a} \cdot d \tag{19}$$

If these models are introduced in equation (14) and equation (2) is considered, the factors d can be calculated directly. The results are:

Model 1:

$$d = 1/f \tag{20}$$

Model 2:

$$d = \frac{m \cdot c_v \cdot l_v}{(m \cdot c_{h,a} \cdot l_h - f \cdot EG_a \cdot c_{h,a} \cdot c_v \cdot l)} \tag{21}$$

Model 3:

$$d = \frac{m \cdot c_h \cdot l_h}{(m \cdot c_{v,a} \cdot l_v + f \cdot EG_a \cdot c_h \cdot c_{v,a} \cdot l)} \tag{22}$$

Model 4:

$$d = \frac{m\left(l_h \frac{c_{h,a}}{c_{v,a}} - l_v\right)}{c_{h,a}\left(EG_a \cdot f \cdot l - m \frac{l_h}{c'_L}\right)} \tag{23}$$

Figure 3:
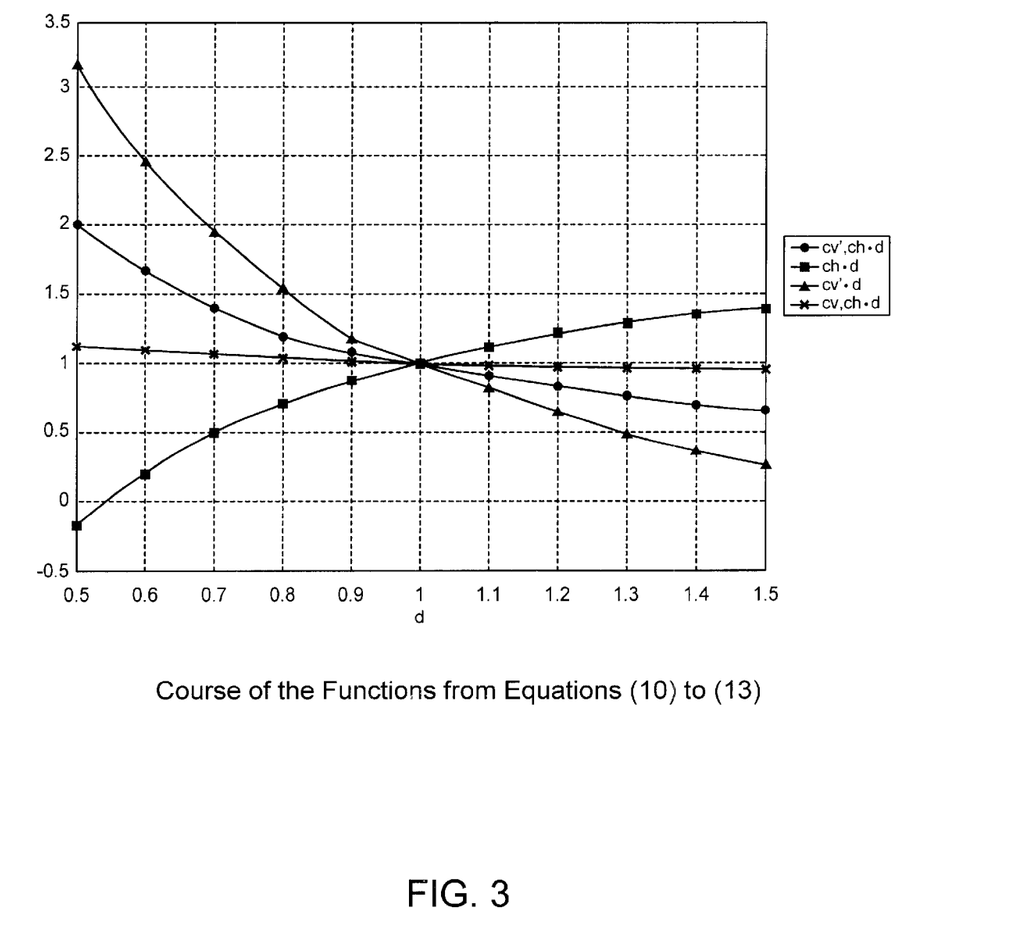
FIG. 3 shows multiplication factors f for an original self-steering gradient EGa subject to change factors d for wheel stiffness values according to the invention.
Figure 4:
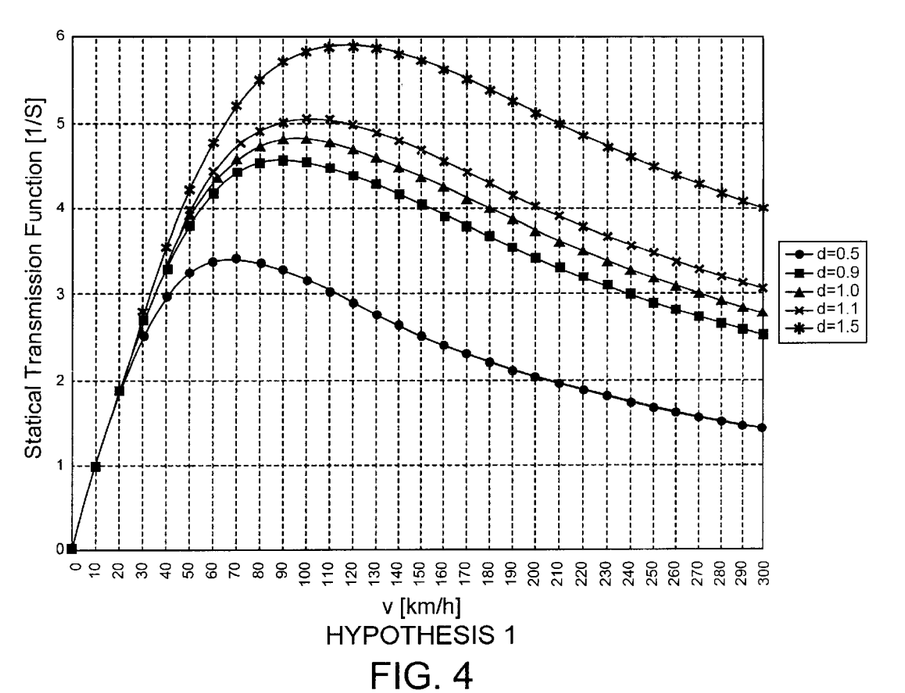
FIG. 4 shows a first transmitting function 1/s subject to speed according to the invention.
Figure 5:
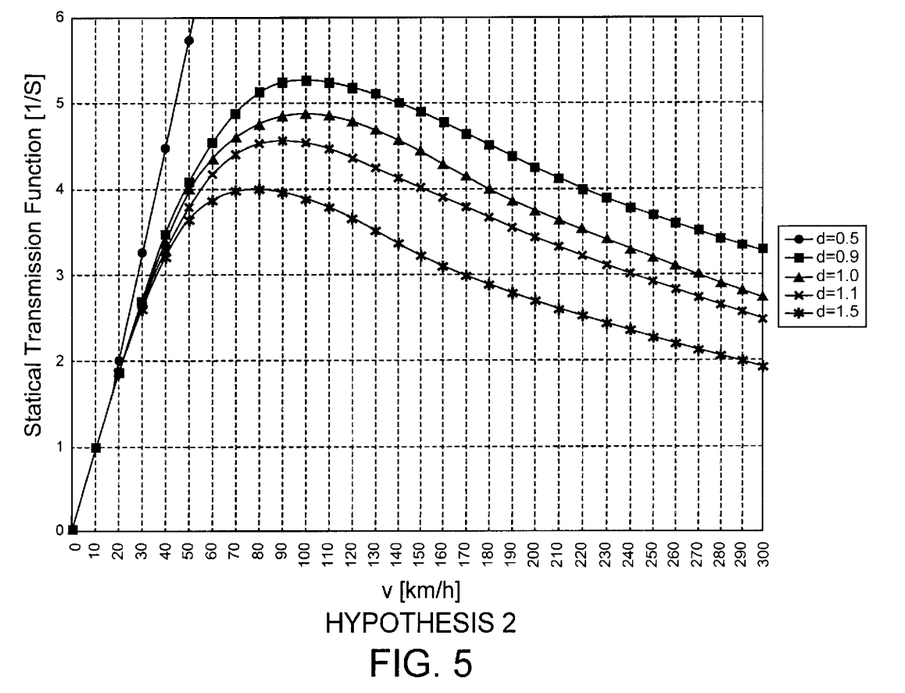
FIG. 5 shows a second transmitting function 1/s subject to speed according to the invention.
Figure 6:
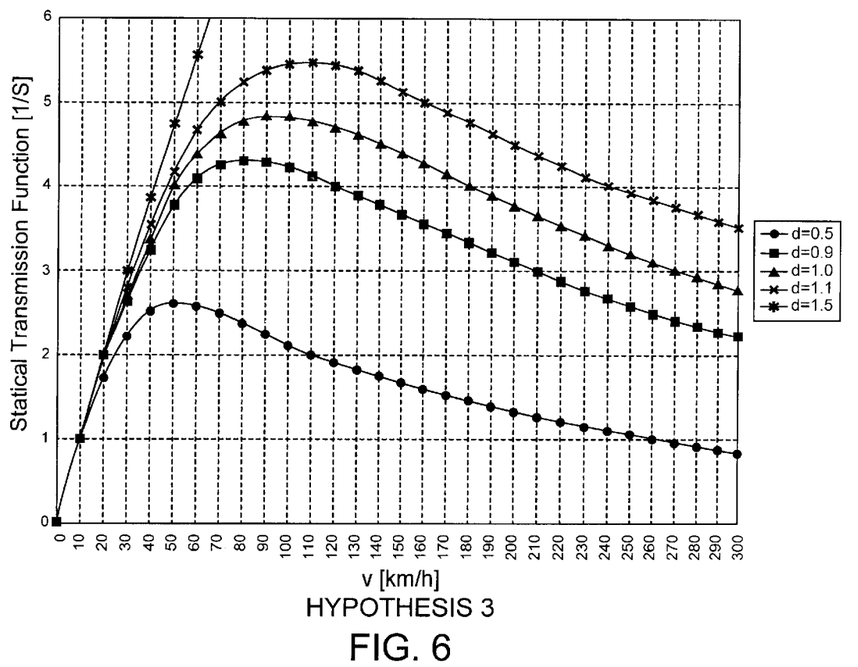
FIG. 6 shows another transmitting function 1/s subject to speed according to the invention.
Figure 7:
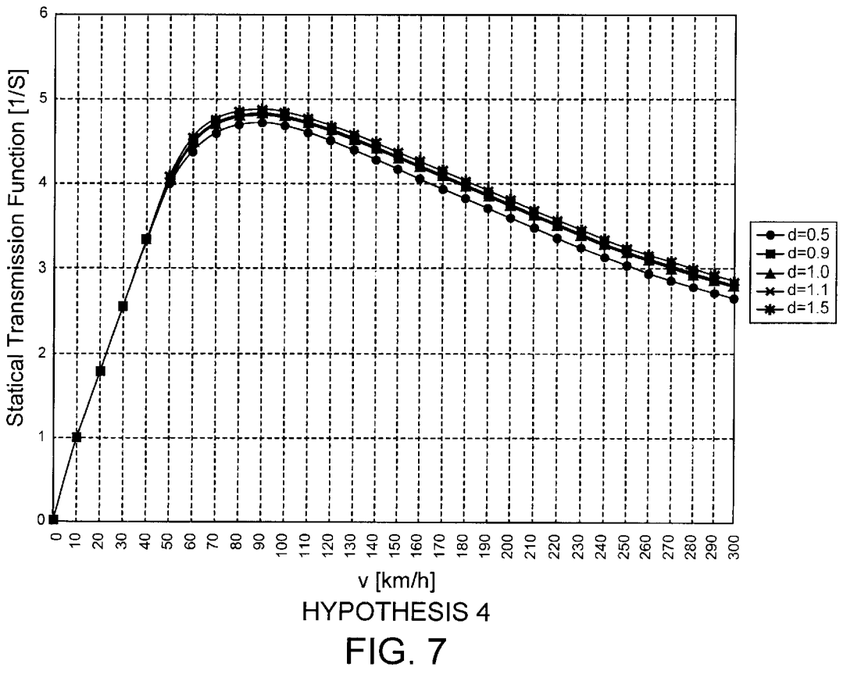
FIG. 7 shows another transmitting function 1/s subject to speed according to the invention.

These functions are represented in an exemplary manner for the following parameters in FIG. 1 (vehicle: SLK; MB R 170):

m=1453 kg
$c'_v$=80384 N/rad
$C_h$=131565 N/rad
$l_v$=1.128 m
$l_h$=1.264 m
l=2.392 m
EG=0.00434 s²rad/m From FIG. 3 results that the vehicle in case of a reduction of the respective stiffness represented by a reduction of d, only in case of model 2 shows a reduction of the self-steering gradient and thus a reduction of a tendency to understeer. For the two other models the vehicle tends to understeer more if factor d decreases. For the present measurements a behavior was observed which corresponds to model 2, if softer tire stocks are used.

The statements are supported also by the FIGS. 4 to 7 which represent equation (11) over the speed for the mentioned models. Thus it is useful to adapt the self-steering behavior of the single-track model by means of a lateral tire stiffness on the rear axle.

The best embodiment of the invention consists in a derivation of the conditional equation for the self-steering gradients from the stationary transmitting function for identifying the actual self-steering gradient of the vehicle and an adaptation of the self-steering gradient of the single-track model by means of its lateral tire stiffness.

The invention is also applicable to other track models. The represented modifications of the self-steering gradient are executed correspondingly in other track models.

This invention is not limited to changing the self-steering gradient subject to the tire stiffness, but comprises also an influencing of the self-steering gradient by specific parameters of the vehicle and/or standard parameters of the vehicle series to which it belongs.

What is claimed is:

1. Control circuit for controlling driving stability of a vehicle, comprising:
   means for accepting input values representative of a vehicle's course,
   a vehicle model circuit, which on the basis of a vehicle reference model reproducing one or more characteristics of the vehicle, defines at least one nominal value for a control quantity subject to predetermined parameters, wherein at least one of the predetermined parameters is varied subject to at least one of said input values which are measured during a stationary driving behavior, and
   a vehicle identification means having output signals which are used by the vehicle reference model, having the output signals adapt to one or more standard parameters memorised in the vehicle reference model or substitute by one or more newly built standard parameters in consideration of at least one individual condition quantity of the vehicle.

2. Control circuit according to claim 1, wherein the vehicle identification means is provided with an identification plausibility means for switching an identification module into active or passive mode subject to the individual input quantities.

3. Control circuit according to claim 1, wherein the input values include at least one of the following values: the yaw speed, steering angle, steering angle speed, transverse acceleration, longitudinal acceleration, slip angle speed, wheel speed.

4. Control circuit according to claim 2, further including means for determining whether the individual input quantities are lying within a predefined tolerance range.

5. Control circuit according to claim 4, wherein the identification plausibility means informs the identification module as to whether the individual input quantities are lying within the tolerance range.

6. Control circuit according to claim 1, wherein at least of one of the predetermined parameters are varied subject to the separately determined measuring quantity, if the condition 1.5 [m/s²]<transverse acceleration <6.5 [m/s²] is met.

7. Control circuit according to claim 1, wherein at least one of the predetermined parameters are varied subject to the separately determined measuring quantity, if the condition ½ yaw acceleration½<25 [degrees/s²] is met.

8. Control circuit according to claim 1, wherein at least one of the predetermined parameters are varied subject to the separately determined measuring quantity, if the condition ½steering angle speed½<150 [degrees/s] is met.

9. Control circuit according to claim 1, wherein at least one of the predetermined parameters are varied subject to a brake pressure.

10. Control circuit according to claim 1, wherein at least one of the predetermined parameters are varied subject to a motor torque.

11. Control circuit according to claim 1, wherein at least one of the predetermined parameters are varied subject to a friction moment.

12. Control circuit according to claim 1, further including an identification algorithm for generating deviations from individual input values.

13. Control circuit according to claim 12, wherein the deviations of the individual input values are converted into parameter deviations of the predetermined parameters.

14. Control circuit according to claim 12, wherein the parameter deviations from the predetermined parameters are defined within predetermined limit value ranges.

15. Control circuit according to claim 12, wherein the parameter deviations of the predetermined parameters are calculated with a stationary vehicle motion on the basis of a stationary equation of the vehicle reference model.

16. Control circuit according to claim 1, wherein a single-track model is the vehicle reference model.

17. Control circuit according to claim 13, wherein at least one of the predetermined parameters corresponds to a lateral tire stiffness of one or more tires or depends on the lateral tire stiffness of one or more vehicle tires.

18. Control circuit according to claim 17, wherein a self-steering gradient EG is used depending, as follows, on the lateral tire stiffness:

$$EG = \frac{m(c_h \cdot l_h - c'_v \cdot l_v)}{c_h \cdot c'_v \cdot l},$$

m being a vehicle mass
$c'_v$ being a total lateral stiffness on a front axle
h being a lateral tire stiffness on the rear axle
v being a distance front axle/centre of gravity
$l_h$ being a distance rear axle/centre of gravity and
l being a wheel base.

19. Control circuit according to claim 18, wherein a total lateral stiffness of the front axle is used consisting of a lateral tire stiffness and a steering stiffness as follows:

$$\frac{1}{c'_v} = \frac{1}{c_v} + \frac{1}{c'_L},$$

with $c'_L$ being the steering stiffness (with regard to a total trail) and $c_v$ being the lateral tire stiffness of the front axle.

20. Control circuit according to claim 19, wherein the lateral tire stiffness $c_v$ of the front axle tires and the lateral tire stiffness $c_h$ of the rear axle tires are modified in the control circuit by modification by an equal factor d:

$c'_v = c_{v,a} \cdot d$ and $c_h = c_{h,a} \cdot d$.

21. Control circuit according to claim 20, wherein factor d corresponds essentially to the following formula:

$d = 1/f$ f being a factor which indicates how much the self-steering gradient EG has changed with regard to the original self-steering gradient $EG_a$.

22. Control circuit according to claim 17, wherein the lateral tire stiffness on the rear axle $c_{h,a}$ is modified in the vehicle model control circuit by factor d and that the lateral stiffness of the front axle remains essentially constant:

$c'_v = $konst and $c_h = c_{h,a} \cdot d$.

23. Control circuit according to claim 22, wherein factor d corresponds essentially to the following formula:

$$d = \frac{m \cdot c_v \cdot l_v}{(m \cdot c_{h,a} \cdot l_h - f \cdot EG_a \cdot c_{h,a} \cdot c_v \cdot l)}$$

f being a factor which indicates how much a self-steering gradient EG has changed with regard to the original self-steering gradient $EG_a$ and m being a vehicle mass
$c_v$ being a lateral tire stiffness of the front axle tires
$c_h$ being a lateral tire stiffness of the rear axle tires
$l_v$ being a distance front axle/centre of gravity
$l_h$ being a distance rear axle/centre of gravity
l being a wheel base.

24. Control circuit according to claim 18, wherein the lateral stiffness of the front axle $c'_v$ is changed by a factor d in the control circuit and that the lateral tire stiffness of the rear axle tires remains essentially constant:

$c'_v = c_{v,a} \cdot d$ and $c_h = $konst.

25. Control circuit according to claim 24, wherein factor d corresponds essentially to the following formula:

$$d = \frac{m \cdot c_h \cdot l_h}{(m \cdot c_{v,a} \cdot l_v + f \cdot EG_a \cdot c_h \cdot c_{v,a} \cdot l)},$$

f being a factor which indicates how much the self-steering gradient EG has changed with regard to the original self-steering gradient $EG_a$ m being a vehicle mass $c_v$ being a lateral tire stiffness of the front axle tires $c_h$ being a lateral tire stiffness of the rear axle tires $l_v$ being the distance front axle/centre of gravity $l_h$ being the distance rear axle/centre of gravity being a wheelbase l being a wheelbase.

26. Control circuit according to claim 20, wherein the lateral tire stiffness $C_{h,a}$ of the rear axle tires and the lateral tire stiffness $C_{v,a}$ of the front axle tires are modified by a factor d in the control circuit:

$c_v = c_{v,a} \cdot d$ and $c_h = c_{h,a} \cdot d$.

27. Control circuit according to claim 26, wherein factor d corresponds essentially to the following formula:

$$d = \frac{m\left(l_h \frac{c_{h,a}}{c_{v,a}} - l_v\right)}{c_{h,a}\left(EG_a \cdot f \cdot l - m\frac{l_h}{c'_L}\right)}$$

f being a factor which indicates how much the self-steering gradient EG has changed with regard to the original self-steering gradient EGa m being a vehicle mass $c_v$ being a lateral tire stiffness of the front axle tires $c_h$ being a lateral tire stiffness of the rear axle tires $l_v$ being the distance front axle/centre of gravity $l_h$ being the distance rear axle/centre of gravity l being a wheelbase.

28. Control circuit according to claim 25, wherein the lateral tire stiffness $C_{h\_neu}$ is determined as follows from the original lateral tire stiffness $C_{h\_alt}$:

$$1024 * \frac{c_{r\_neu}}{c_{r\_alt}} = \frac{v * \frac{1024 * c_f * l_f}{2 * c_{r\_alt}}}{\frac{v}{2} + \frac{1}{v} * \frac{c_f * l^2}{2 * m * l_r} - \frac{\delta}{\dot{\psi}} * \frac{c_f * l}{2 * m * l_r}} = \Delta C_{r\_corr\_fac}$$

K being a constant $\dot{\psi}$ being a yaw rate of the vehicle $\delta$ being a steering angle l being the distance of the vehicle axles (wheel base)

v being a vehicle speed.

29. Control circuit according to claim 13, wherein the parameter deviations of the predetermined parameters are learned by algorithms for identifying the parameters.

30. Control circuit according to claim 13, wherein the parameter deviations of the predetermined parameters are learned by means of one of a Least Square procedure (LS), a Generalized Least Square procedure (GLS), an Instrumental Variable procedure (IV), a Maximum Likelihood procedure (ML), and an Output Error procedure.

* * * * *